United States Patent

[11] 3,609,615

| [72] | Inventors | Richard G. Parker<br>Wallkill;<br>Bruce G. Tolen, Goshen, both of N.Y. |
|------|-----------|---|
| [21] | Appl. No. | 39,327 |
| [22] | Filed | May 21, 1970 |
| [45] | Patented | Sept. 28, 1971 |
| [73] | Assignee | Fair-Rite Products |

[54] ADJUSTABLE FERRITE CORES
13 Claims, 2 Drawing Figs.

[52] U.S. Cl. ..................................................... 336/178,
336/83, 336/210, 336/219
[51] Int. Cl. ..................................................... H01f 27/24
[50] Field of Search .......................................... 336/178,
165, 83, 219, 212, 210

[56] References Cited
UNITED STATES PATENTS

| 2,494,180 | 1/1950 | Koubek | 336/178 X |
| 2,628,342 | 2/1953 | Taylor | 336/178 X |
| 3,195,086 | 1/1965 | Taylor | 336/178 X |

FOREIGN PATENTS

| 951,099 | 10/1956 | Germany | 336/178 |

*Primary Examiner*—Thomas J. Kozma
*Attorneys*—James M. Heilman and Heilman & Heilman ABSTRACT: Two halves of a pot core permanently joined together by a mixture of a chemically setting adhesive material and deformable, preferably hollow, plastic type bubbles. The halves are held in position by a center screw which adjusts the parts against each other to a close tolerance fixed inductance while the gapping material therebetween cures, preferably at air or room temperature, the center screw (or outside clamps for C-cores or E-cores) may be removed after the two halves are permanently secured to each other.

PATENTED SEP28 1971 3,609,615
FIG. 1.
FIG. 2.
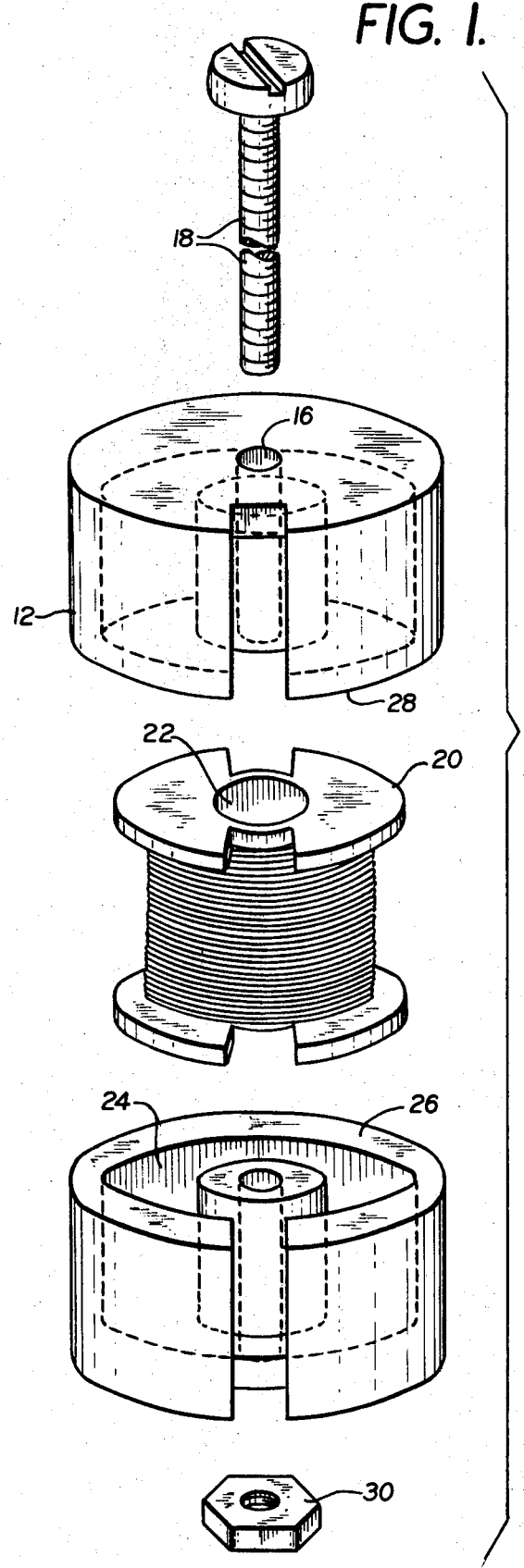
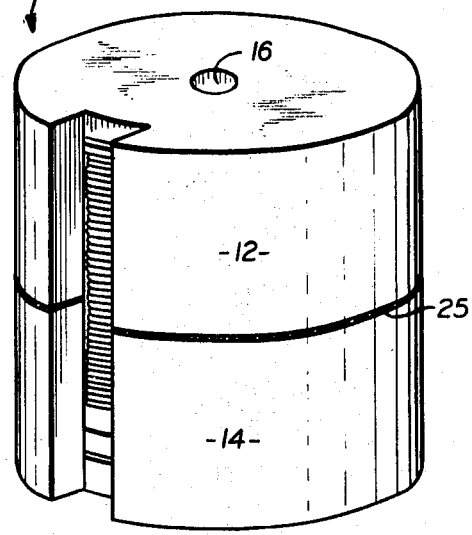
INVENTORS
RICHARD G. PARKER
BRUCE G. TOLEN
BY
James M. Heilman
ATTORNEY.

ADJUSTABLE FERRITE CORES

BACKGROUND OF THE INVENTION

This invention relates generally to an adjustable ferrite core with an airgap, and more particularly, to a pot core whose inductance is capable of being adjusted and permanently fixed.

In utilizing ferrite cores for inductors, one typical configuration is the pot core. When the two halves of a pot core joined together, if the two ground mating surfaces are not gapped, the typical permeability tolerance is plus or minus 20 percent. If a gap formed by a plastic or paper film is introduced between the mating surfaces, the tolerance may be reduced to plus or minus 10 percent.

In order to achieve closer tolerances for the fixed inductor, a variety of means has been developed. In some cases, portions of the center post are removed so that the reluctance of the magnetic path may be varied. In other instances, one of the center portions or posts of one or both halves of the pot core is fabricated so that there will be a gap between the two posts when the peripheries of the pot cores are joined.

To achieve adjustment in the foregoing arrangement, a center hole is utilized through the center post. A slug or rod of magnetically soft material is then placed in this hole, and the reluctance of the path between the two center posts can be varied by the movement of the magnetic slug or rod into and out from this gap. This technique is most valuable when periodic adjustments must be made of the inductor; however, there are many instances in which the inductor may be adjusted to a specific inductance but once.

The above method of adjustment involves many parts, and is expensive both in terms of the parts and in the assembly of these parts. Inductors have been made using materials such as rubber or a distortable plastic as a gap material. However, such materials are prone to a gradual change in physical dimensions and consequently cannot guarantee a stable adjustment of inductance. Additionally, the gap must be of substantial size, for instance, 0.010 to 0.050 in order to permit flow of the rubber or plastic material. In such instances a screw, typically brass, is placed through a center hole in the pot core and tightened until the two pot cores achieved the proper spacing for the desired inductance.

An object of the present invention is to provide an improved ferrite core.

Another object of the present invention is to provide a ferrite core capable of having a close tolerance fixed inductance which is easily and economically adjusted during manufacture, but thereafter remains fixed and stable.

Still another object of the present invention is to provide a ferrite core with a high Q and low core losses.

Yet another object of the present invention is to provide a ferrite core with a smaller gap than presently available.

Other objects, advantages, and features of the present invention will become more apparent form the following description.

SUMMARY OF THE INVENTION

In accordance with the principles of the present invention, the above objects are accomplished by providing a ferrite core including a gap comprising, in combination, two sections having mating surfaces, the gap being between the mating surfaces, gapping material inserted in the gap rigidly securing the two sections together characterized in that the gapping material comprises deformable plastic type bubbles mixed in a chemical capable of being cured and securing the two sections together.

It has been found that when the plastic type bubbles are mixed with epoxy resin in the order of 50 percent by volume, an inductor can be made that is easily adjustable during its manufacture to a tolerance of approximately 1 percent, and after curing of the resin, will remain fixed at the desired inductance. The plastic type bubbles may be spherical in configuration and range from 0.0001 to 0.0010 inches. The plastic and epoxy resin are mixed and applied to the mating surfaces of two halves of a pot core. The two halves are held together while the resin cures by means of a suitable clamp or machine screw placed through the center hole of the pot core with a nut at the opposite end. It has been founded that by tightening the screw, the inductance of a coil placed in the pot core is adjustable over a range of approximately plus or minus 25 percent of the value determined by the coil. Upon removal of the machine screw which is used for the initial adjustment, the Q increases because the metallic material is removed entirely form the magnetic circuitry.

FIGURES

FIG. 1 is an assembly diagram of the present invention.

FIG. 2 is a front perspective view of a pot core embodying the principles of the present invention.

DETAILED DESCRIPTION

The principles of the present invention are applicable to inductors which include an air gap such as pot cores, "E" and "C" shaped cores. For purposes of illustration, the principles of the present invention will be described with a pot care. The pot core 10 comprises two halves, an upper half 12 and a lower half 14 and an axial center hole 16 through each of the halves. The axial center hole 16 is adapted to receive a center post or rod 18 which may serve a plurality of purposes. The center post may be used to adjust the inductance of the pot core and may also hold the two halves together. A plastic bobbin 20 fits into the lower half 14, and a coil is wound around the core of the plastic bobbin providing the desired magnetic characteristics. A center hole 22 is provided in the core which aligns with center hole 16 of the upper and lower halves 12 and 14, respectively. The lower half 14 is provided with a recess 24 having a shape complimentary to that of the bobbin 20, permitting the bobbin to be inserted in the lower half.

A gapping material 25 is placed on mating surfaces 26 and 28 of the upper and lower halves to provide the desired gap and secure the two halves together. In accordance with the principles of the present invention, the gapping material comprises a mixture of deformable plastic bubbles and material capable of being cured to secure the two halves together.

The plastic bubbles may be of uniform or nonuniform size and may be of regular or irregular configuration. The bubbles may be of spherical or of any other geometric shape, and may be either hollow or solid. An epoxy resin, preferably, is utilized as the material for securing the halves together but other adhesives, resins, or cements that will cure, preferably at ambient or near ambient temperatures and remain sufficiently rigid after curing to prevent substantial movement of the mating cores, may be utilized. As an illustration of one mixture providing the desired performance, approximately 50 percent volume of hollow Saran (trademark of Dow Chemical Corporation) spheres 25–60 microns in diameter having a density of less than 1 pound per cubic foot were mixed with an equal volume of an epoxy system known as Eccobond 45 (trademark of Emerson & Cuming, Inc.).

In assembling the pot core, the gapping material is applied to the mating surfaces. A machine screw is used as the center post 18 and placed through the center hole 16 with a nut 30 at the opposite end. By tightening the screw, the inductance of the coil placed in the pot core is adjustable over the above indicated range of about 20 percent. This change of inductance is retraceable, and an exact adjustment of inductance to 1 percent is easily achieved. In a few hours after the epoxy had cured, the inductor was measured again and found to be within the desired range. Subsequent checks made one day, and again one week later, showed that there had been no change in the inductance.

Removal of the brass screw used for initial adjustment made no change in the inductance of the inductor, but did increase the Q since the brass material was removed entirely from the magnetic circuitry.

The mixture of the deformable plastic and chemically setting adhesive creates a maximum gap of approximately 0.002 inches.

Other methods of adjustment, such as a C-clamp or other clamping devices which are essentially nonmagnetic in character, may be substituted for the machine screw and nut.

TYPICAL EXAMPLE

A series of inductors were constructed using 2 pot cores, each measuring 0.563" O.D.× 0.250" high with a nylon or Delrin (trademark of General Electric Co.) bobbin wound with 3,400 turns of 043 insulated wire. The pot core was made from a ferrite material with an initial permeability of 2,500. Six of these units were assembled with the gapping material as described above. This material was placed on the mating surfaces. A bass machine screw was placed through the center hole, a nut attached, and the screw tightened.

The winding was connected across the terminals of an inductance bridge and the inductors were adjusted, as noted on table 1, by tightening or loosening the screws. Inductance readings were taken again after the adhesive had hardened. The parts were temperature cycled from 25° C. to 0° to 100° C., and the parts measured again.

A ± 25 percent tuning range was achieved which a far wider range then can be achieved using any other known method. If a 0.001 thick Mylar (trademark of DuPont & Co.) spacer had been placed on the center post, an inductance of approximately 4.5 henries would have been achieved. This particular mixture of deformable plastic and chemically setting adhesive created an optimum gap of somewhat more than 0.001". The variation from the initial setting was less in those adjusted to the 4.00 henry reading.

| Sample number | Initial adjustment | 24 hr. reading (adhesive set) | 10 day reading | Temp. cycling 25° C. to 0° C. to 100° C. to 25° C. stabilize at 25° C. for 24 hrs. |
| --- | --- | --- | --- | --- |
| 1 | 4.00 | 4.02 | 4.02 | 4.02 |
| 2 | 4.00 | 3.98 | 3.99 | 3.99 |
| 3 | 4.00 | 4.03 | 4.03 | 4.03 |
| 4 | 4.00 | 4.04 | 4.04 | 4.04 |
| 5 | 3.00 | 3.05 | 3.04 | 3.05 |
| 6 | 5.00 | 4.94 | 4.94 | 4.98 |

The above description illustrates the principles of the present invention and, therefore, should not be constructed in a limiting sense. To that end, the invention should be accorded its proper full scope of protection as set forth in this application.

We claim:

1. A ferrite core including a gap comprising, in combination, two sections having mating surfaces, said gap being between said mating surfaces, gapping material inserted in said gap rigidly securing said two sections together, characterized in that said gapping material comprises deformable plastic type bubbles mixed in a chemical material securing said two sections together.

2. A ferrite core as set forth in claim 1 wherein said material comprises an adhesive material.

3. A ferrite core as set forth in claim 1 wherein said material comprises epoxy resin.

4. A ferrite core as set forth in claim 1 wherein said bubbles are of a spherical configuration.

5. A ferrite core as set forth in claim 1 wherein said bubbles are uniform in size.

6. A ferrite core as set forth in claim 1 wherein said bubbles are nonuniform in size.

7. A ferrite core as set forth in claim 1 wherein said plastic-type bubbles are spheres.

8. A ferrite core as set forth in claim 1 wherein said gap is no greater than approximately 0.001 inch.

9. A ferrite core as set forth in claim 1 wherein said ferrite core is a pot core.

10. A ferrite core as set forth in claim 1 wherein the inductance of said core is proportional to the size of said gap.

11. A ferrite core as set forth in claim 10 including a central axial hole through each of said two sections, said hole for receiving a threaded center post and a threaded member attached to said center post for holding said two sections together while said material cures in said gap.

12. A ferrite core as set forth in claim 11 wherein said threaded post and threaded member are removable from said core after said material cures.

13 A ferrite core as set forth in claim 10 being provided with clamp means for holding said two sections together while said material cures.